United States Patent
Chuang et al.

(10) Patent No.: US 12,012,477 B2
(45) Date of Patent: Jun. 18, 2024

(54) HYBRID POLYURETHANE-POLYHYDROXYURETHANE COMPOSITION

(71) Applicant: Huntsman International LLC, The Woodlands, TX (US)

(72) Inventors: Ya-Mi Chuang, Lanaken (BE); Giulio Martini, Leuven (BE); Christopher Phanopoulos, Moorsel (BE)

(73) Assignee: Huntsman International LLC

( * ) Notice: Subject to any disclaimer, the term of this patent is extended or adjusted under 35 U.S.C. 154(b) by 576 days.

(21) Appl. No.: 17/281,766

(22) PCT Filed: Sep. 27, 2019

(86) PCT No.: PCT/EP2019/076260
§ 371 (c)(1),
(2) Date: Mar. 31, 2021

(87) PCT Pub. No.: WO2020/070018
PCT Pub. Date: Apr. 9, 2020

(65) Prior Publication Data
US 2021/0395429 A1    Dec. 23, 2021

(30) Foreign Application Priority Data

Oct. 4, 2018 (EP) .................................... 18198612

(51) Int. Cl.
| | |
|---|---|
| *C08G 18/10* | (2006.01) |
| *C08G 18/28* | (2006.01) |
| *C08G 18/38* | (2006.01) |
| *C08G 18/48* | (2006.01) |
| *C08G 18/76* | (2006.01) |

(52) U.S. Cl.
CPC .......... *C08G 18/10* (2013.01); *C08G 18/284* (2013.01); *C08G 18/3819* (2013.01); *C08G 18/4825* (2013.01); *C08G 18/7671* (2013.01)

(58) Field of Classification Search
CPC ... C08G 18/10; C08G 18/2815; C08G 18/284
See application file for complete search history.

(56) References Cited

U.S. PATENT DOCUMENTS

| 5,132,040 A * | 7/1992 | Randall .............. C08G 18/3218 252/182.25 |
| 2006/0084725 A1* | 4/2006 | Gam .................... C09D 175/04 523/415 |
| 2012/0252959 A1* | 10/2012 | Trindade ................ C08G 18/73 524/507 |
| 2015/0225363 A1* | 8/2015 | Laas .................. C08G 18/3218 549/228 |
| 2017/0107321 A1 | 4/2017 | Michaud et al. |
| 2017/0291982 A1* | 10/2017 | Odriozola .............. C09J 175/04 |
| 2019/0241779 A1* | 8/2019 | Michaud ................ C08G 71/04 |

OTHER PUBLICATIONS

International Search Report and Written Opinion received in corresponding PCT Application PCT/US2019/076260, completed Oct. 28, 2019 and dated Jan. 27, 2020.
Leitsch Emily Ket Al: "Polyurethane/polyhydroxyurethane hybrid polymers and their applications as adhesive bonding agents", International Journal of Adhesion and Adhesives, Elsevier, Amsterdam, NL, vol. 64, Sep. 5, 2015 (Sep. 5, 2015), pp. 1-8, XP029300253, ISSN: 0143-7496, DOI: 10.1016/J.JADHADH.2015.09.001; 2.2.-2.4.; pp. 2-3; Scheme 1.

* cited by examiner

*Primary Examiner* — Michael L Leonard
(74) *Attorney, Agent, or Firm* — Huntsman International; Lewis Craft

(57) ABSTRACT

The present invention relates to a hybrid polyurethane-polyhydroxyurethane (PU-PHU) composition obtained by a process comprising the following steps:
(i) Reacting at least one isocyanate containing compound, in stoichiometric excess, with at least one isocyanate-reactive compound, resulting in the formation of at least one prepolymer,
(ii) Reacting said at least one prepolymer with at least one cyclic carbonate functional group containing compound, leading to the formation of a cyclic carbonate-terminated prepolymer,
(iii) Ring-opening reaction of said cyclic carbonate-terminated prepolymer with at least one amine functional group containing compound resulting in said hybrid PU-PHU composition,
characterised in that said ring-opening reaction step is carried out above room temperature, preferably above 20° C., more preferably above 25° C.

17 Claims, No Drawings

HYBRID POLYURETHANE-POLYHYDROXYURETHANE COMPOSITION

CROSS-REFERENCE TO RELATED APPLICATIONS

This application is the National Phase of International Application PCT/EP2019/076260 filed Sep. 27, 2019 which designated the U.S. and which claims priority to European App. Serial No. 18198612.6 filed Oct. 4, 2018. The noted applications are incorporated herein by reference.

The present invention relates to hybrid polyurethane-polyhydroxyurethane (PU-PHU) composition and to product comprising such hybrid PU-PHU composition.

Typically, polyurethane (PU) networks can be either thermoset materials, or thermoplastic materials, depending on the structure of the polymer involved. Thermoplastic polymers essentially consist in linear polymer chains, whereas thermoset polymers consist in branched cross-linked polymer chains.

More precisely, thermoset materials are cured thermosetting polymers, which become irreversibly hardened upon being cured. Curing reaction results in cross-linking between polymer chains to give an infusible and insoluble polymer network. It is known that traditional covalent polymer networks, such as thermoset PU networks, cannot be easily recycled for high value applications. Irreversible cross-linked linkages can prevent them from being reprocessed. Contrarily to thermoset materials, thermoplastic polymers have such internal chemical structure, that reprocessability occurs, without necessarily applying any external stimulus other than simple heat and shear.

In recent years, there has been a growing interest in developing solutions for providing isocyanate-free systems, whilst leaving isocyanate reactivity unaltered. Basically, two strategies have been developed with the goal of providing isocyanate-free system.

The first strategy relies on the development of polyhydroxyurethane-based system, exclusively resulting from the reaction between glycerol carbonate (GC) and amines.

The second strategy is based on adapting current polyurethane networks made of isocyanate-terminated prepolymer, commonly obtained by reacting isocyanate-reactive compound with isocyanate containing compound. Such isocyanate-terminated prepolymer can be functionalised with cyclic carbonate compounds, resulting in the formation of carbonate-terminated prepolymer, allowing end-capping of isocyanate-reactive groups, preferably located in the ends of the aforementioned prepolymer. According to this second strategy, amines can be reacted with this carbonate-terminated prepolymer for curing reactions, resulting in the formation of cross-linked linkages. This method provides hybrid system, since polyurethane and polyhydroxyurethane (PU-PHU) linkages are present in the final compound, usually known as thermoset material.

The present invention relates to the second strategy, which has several drawbacks, in terms of the number of steps involved in known manufacturing processes. Moreover, the viscosity of the carbonate-terminated prepolymer should be appropriate, since it will determine the latitude that the user will have regarding the applications of the final product, obtained after cure.

The difficulty relies on finding a compromise between thermoplastic material properties and thermoset material properties, by taking into account the aforementioned needs.

Fine-tuning the viscosity in the current known manufacturing processes consists in using solvents. This makes the process expensive and not convenient, since this implies the use of additional steps for removing solvents from the final product. Moreover, the process necessitates a long time to be fully performed, which is a limiting factor for industrial applications. It has also been considered that such processes do not guarantee reprocessability of the final cured product, when thermoset materials are obtained.

Moreover, fine-tuning viscosity is limited in known processes, in such a way that mechanical properties of final products are not satisfactory.

For the aforementioned reasons, there is a need to provide hybrid PU-PHU compositions that can be obtained by a simpler and cost-effective process, enabling the user to apply the final cured product in several fields of application.

It is an object of the present invention to overcome the aforementioned drawbacks by providing hybrid PU-PHU compositions (thermoplastic materials or thermoset materials) that are obtained by a simpler, less expensive process, enabling at the same time a certain latitude regarding the final properties of the product, in particular in terms of mechanical properties.

In this respect, the present invention provides a hybrid polyurethane-polyhydroxyurethane (PU-PHU) composition obtained by a process comprising the following steps:

(i) Reacting at least one isocyanate containing compound, in stoichiometric excess, with at least one isocyanate-reactive compound, resulting in the formation of at least one prepolymer, (ii) Reacting said at least one prepolymer with at least one cyclic carbonate functional group containing compound, leading to the formation of a cyclic carbonate-terminated prepolymer, (iii) Ring-opening reaction of said cyclic carbonate-terminated prepolymer with at least one amine functional group containing compound resulting in said hybrid PU-PHU composition, characterised in that said ring-opening reaction step is carried out above room temperature, preferably above 20° C., more preferably above 25° C.

It has been observed that applying a temperature, which is higher than room temperature (preferably above 20° C., more preferably above 25° C.) in step (iii) enables providing a final cured product with improved mechanical properties. Notably, it was observed that some final cured products had a high value of elongation at break (>2600%).

Said at least one amine functional group containing compound can preferably have an amine functional group, which has a functionality of at least 2. More preferably, said at least one amine functional group containing compound is an amine having a functionality of at least 2.

Said at least one isocyanate containing compound is preferably a polyisocyanate containing compound.

The hybrid composition obtained by the process of the present invention is particularly advantageous, since it guarantees that carbonate functionalities of the cyclic carbonate-terminated prepolymer are preserved, until polymerisation with amine. In other words, it was unexpected to be able to polymerise the cyclic carbonate-terminated prepolymer in the presence of amines, without thermally degrading carbonate functionalities.

Moreover, the use of a solvent is no longer necessary in the system, which is more convenient for the user and the viscosity can be fine-tuned giving latitude regarding the end uses of the product obtained by the process of the present invention.

It has also been discovered that the presence of reactive hydroxyl groups in the final cured material allows hydroxyurethane bonds to show reversibility under certain conditions of temperature and pressure (see below). PU-PHU products of the present invention can thereby be defined as reprocessable thermoset materials, when at least one component used to provide the hybrid PU-PHU products of the present invention has a functionality of at least 2. Advantageously, said at least one isocyanate containing compound can be a polyisocyanate with a functionality of at least 2 or said at least one isocyanate-reactive compound has a functionality of at least 2 or said at least one cyclic carbonate functional group containing compound has cyclic carbonate functional group with a functionality of at least 2 or said at least one amine functional group containing compound having an amine functionality of at least 2. Other functional groups could optionally also be incorporated into said at least one amine functional group containing compound.

More advantageously, the at least one isocyanate containing compound is polyisocyanate with a functionality of at least 2, or the at least one isocyanate-reactive compound is a polyol or mixture of polyols with a functionality of at least 2, or the at least one cyclic carbonate functional group containing compound is glycerol carbonate with a functionality of at least 2, or said at least one amine functional group is amine with a functionality of at least 2. Combinations are also possible.

When thermoset polymers are obtained by the process of the present invention, it is possible to reprocess such materials, and this is unexpected in view of known thermoset materials, which are difficult to reprocess, recycle or melt. The reversible behaviour of hydroxyurethane bonds allows the user to reprocess the final material several times, preferably at least up to 3 times, without adversely affecting mechanical properties.

Depending on the compounds used in the process of the present invention, thermoset polymers or thermoplastic polymers can be provided, with the possibility of further reprocessing thermoset hybrid PU-PHU polymer, at a later stage, by applying at least one stimulus (see below).

Advantageously, said at least one cyclic carbonate functional group containing compound comprises at least one 4-membered cyclic carbonate, preferably at least one 5-membered cyclic carbonate, more preferably at least one 6-membered cyclic carbonate. Said at least one 5-membered cyclic carbonate can be preferred for sensitivity and reactivity reasons.

More advantageously, the amine of said at least one amine functional group containing compound has a functionality of at least 1.8.

According to a particular embodiment of the present invention, the temperature at which said ring-opening reaction step (iii) is carried out ranges from 25° C. to 160° C., preferably between 40° C. and 160° C., more preferably between 45° C. and 140° C.

Step (ii) mainly provides one-single phase made of cyclic carbonate-terminated prepolymer, ready to be reacted with amines.

The selection of temperature enabled defining ranges, where thermal degradation of carbonate functionalities is limited, even avoided. The use of a solvent is therefore no longer essential.

According to a preferred embodiment of the present invention, said isocyanate-reactive compound has a number average molecular weight equal to or higher than 62, preferably higher than 400, more preferably higher than 1000, even more preferably higher than 2000, most preferably higher than 3800.

Advantageously, said isocyanate-reactive compound is a mixture of isocyanate-reactive compounds, such as a mixture of polyols.

Preferably, the isocyanate-reactive compound has a number average molecular weight between 62 and 12000.

It was advantageously observed that using isocyanate-reactive compound with a number average molecular weight above 3800, for instance equal to 4000, enables forming a prepolymer with a lower viscosity (compared with for instance, isocyanate-reactive compounds having a number average molecular weight below 2500) resulting in the formation of said cyclic carbonate-terminated prepolymer with a reduced viscosity as well, compared with the ones obtained by the use of isocyanate-reactive compounds with a number average molecular weight below 3800, preferably below 2500.

This feature also contributes to fine-tune viscosity, which is particularly advantageous.

In a particular embodiment of the present invention, step (ii) is carried out at a molar ratio of said at least one prepolymer to said at least one cyclic carbonate functional group containing compound, which is reactive towards the NCO groups of the at least one prepolymer (for instances, NCO:OH, NCO:NH$_2$, NCO:NH and NCO:SH) ranging from 0.5 to 1.05, preferably 0.8 to 1.

The cyclic carbonate functional group containing compound can comprise isocyanate reactive groups, such as OH, NH$_2$, NH or SH.

Preferably, step (i) is carried out at a molar ratio of said at least one isocyanate containing compound to said at least one isocyanate-reactive compound (e.g., NCO:OH) ranging from 1.8 to 25, preferably 2 to 5.

In the present invention, said at least one prepolymer has advantageously an NCO value ranging from 0.8 to 25%, more preferably from 0.8 to 10%.

According to a preferred embodiment of the present invention, step (ii) is performed at a temperature ranging from 50° C. to 150° C., preferably from 60° C. to 130° C., more preferably from 80° C. to 125° C., most preferably ranging from 95° C. to 122° C.

In a particular embodiment of the present invention, step (ii) can be carried out in a solvent free condition.

Advantageously, step (iii) can be carried out in a solvent free condition.

More advantageously, step (ii) and/or step (iii) can be carried out in presence of a catalyst selected from the group consisting of organic bases, organic acids, organo-metals, in particular dibutytltin dilaurate (DBTDL), cyclic carbonate and combinations thereof.

Even more advantageously, the catalyst of the present invention is selected from the group consisting of 1,4-diazabicyclo[2.2.2]octane (DABCO), 1,8-diazabicyclo(5.4.0)undec-7-ene (DBU), triazabicyclodecene (TBD), triethylamine, potassium t-butanoate, mixtures thereof, including any other suitable catalysts known by the person skilled in the art.

Preferably, said at least one cyclic carbonate functional group containing compound is selected from the list comprising glycerol carbonate, 4-(hydroxymethyl)-1,3-dioxolan-2-one, 4-(mercaptomethyl)-1,3-dioxolan-2-one, 4-((methylamino)methyl)-1,3-dioxolan-2-one, 4-(aminomethyl)-1,3-dioxolan-2-one, 2-(2-oxo-1,3-dioxolan-4-yl)acetic acid.

More preferably, step (iii) is achieved in a period of time of up to 24 hours, preferably 3 hours, more preferably 2 hours, even more preferably 1 hour.

According to an embodiment of the present invention, the conversion of the cyclic carbonate-terminated prepolymer of step (iii) is preferably of at least 90%, preferably of at least 95%.

In a particular embodiment of the present invention, the hybrid PU-PHU composition can further be processed, after curing, by applying a mechanical pressure onto the final cured product at a predetermined temperature, in order to (re)process, melt or recycle it, without adversely affecting mechanical properties of the final product. It has been discovered that the final cured PU-PHU product obtained by the process of the present invention is particularly advantageous in terms of sustainability. More precisely, the present invention provides a reprocessable polymer network (reprocessable hybrid PU-PHU composition) having self-healing properties, which allow recycling of cross-linked polymers with complete recovery of mechanical properties, stemming from the presence of cross-links. Such PU-PHU composition comprises sufficient dynamic bonds for network reconfiguration under appropriate conditions. This specific embodiment takes place when thermoset polymers are obtained by the process of the present invention or, eventually, any other type of known processes enabling providing a thermoset hybrid PU-PHU polymers. The thermoset polymers obtained in the context of the present invention are highly preferred regarding reprocessability.

The temperature applied during mechanical pressure is preferably of at least 110° C.

The pressure is advantageously of at least 10 kPa.

More advantageously, the time during which the mechanical pressure is applied is of at least 30 seconds.

Unexpectedly, PU-PHU composition of the present invention can be reprocessed multiple times with full recovery of mechanical properties.

Other embodiments of the composition of the present invention are mentioned in the annexed claims.

The present invention also relates to a product comprising a PU-PHU composition according to the present invention.

The product can be an adhesive, a coating, an elastomer or a foam.

Other embodiments of the product of the present invention are mentioned in the annexed claims.

The present invention also relates to a process for manufacturing a reprocessable hybrid PU-PHU composition comprising the following steps:
(i) Reacting at least one isocyanate containing compound, in stoichiometric excess, with at least one isocyanate-reactive compound, resulting in the formation of at least one prepolymer,
(ii) Reacting said at least one prepolymer with at least one cyclic carbonate functional group containing compound, leading to the formation of a cyclic carbonate-terminated prepolymer,
(iii) Ring-opening reaction of said cyclic carbonate-terminated prepolymer with at least one amine functional group containing compound resulting in said hybrid PU-PHU composition,
characterised in that said ring-opening reaction step (iii) is carried out above room temperature, preferably above 20° C., more preferably above 25° C.

All aforementioned features recited for the composition obtained by the above-mentioned process of the present invention are also applicable to the process for manufacturing a reprocessable hybrid PU/PHU composition.

The present invention also relates to a method for processing a thermoset hybrid PU-PHU product, as defined hereinabove.

Typically, thermoset products are difficult to reprocess, melt or recycle after curing, because of their cross-linked structures, which prevent them from being melt-reprocessed. Most of the time, the urethane bonds of these products are not reversible, meaning that they are not able to reform cross-linked bonds. The method of the present invention comprises the following steps:
Providing a cured thermoset hybrid PU-PHU product obtainable by the process according to the present invention, which product has an outer surface,
Processing said thermoset hybrid PU-PHU product by applying at least one stimulus, preferably consisting of mechanical pressure, onto said outer surface, at a predetermined temperature and/or for a predetermined period of time,
Obtaining a processed hybrid PU-PHU product, with full recovery of mechanical properties.

It has been observed that applying a stimulus, preferably consisting of a mechanical pressure, onto the outer surface of said hybrid PU-PHU product, at a predetermined temperature, enables the user to (re)process it, in such a way that mechanical properties can be fully recovered. For instance, this can be useful for "healing" a product having a failure on its surface. The application of a mechanical pressure at a predetermined temperature allows forming new links in the material (by network rearrangements), to rebuild a product without such failure. Another example can also relate to the combination of several pellets, by applying a mechanical pressure at a predetermined temperature, in order to provide one product made from those pellets. We can re-shape the product differently without losing mechanical properties. It was also unexpected to (re)process the material at a predetermined temperature, without thermally degrading the product or observing side reactions. Such products contain dynamic bonds network, which is able to reconfigure under specific conditions, provided by the present invention, notably said stimulus, which can consist of at least one mechanical pressure at a predetermined temperature.

Advantageously, it is also possible to apply the method of the present invention, in order to recycle/upgrade used products.

In a particular embodiment of the method of the present invention, said stimulus consists of applying a mechanical pressure.

Preferably, said mechanical pressure is of at least 10 kPa.

More preferably, said predetermined temperature is of at least 110° C.

Advantageously, said predetermined period of time is of at least 30 seconds.

Shorter processing times minimizes thermal degradation of the material and allows at least 3 cycles of reprocessing, without observing a significant decrease in mechanical properties.

Said cured hybrid PU-PHU product is provided with a Tg ranging from 70° C. to 160° C.

According to a particular embodiment of the method of the present invention, the PU-PHU product can be obtained by reacting a prepolymer with at least 4-membered cyclic carbonates (such as glycerol carbonate) to provide a cyclic carbonate-terminated prepolymer, which is then reacted with amines. The formation of hybrid PU-PHU products enables having reversible hydroxyurethane bonds in the final product, which reversible bonds can be used to reprocess the material. The recycling/reprocessability of the PU-PHU product, under the conditions set by the present invention is thereby possible.

All features linked to the hybrid PU-PHU composition and the process to obtain it are also applicable to PU-PHU product, used in the aforementioned method/process.

Suitable prepolymers are known in the art and commercially available. They are, preferably, the reaction product of an isocyanate containing compound with an isocyanate-reactive compound. Such prepolymers are generally prepared by reacting, in molar excess, of polymeric or pure aromatic isocyanate monomers with one or more polyol(s) using reactive conditions known in the art. The polyols may include aminated polyols, imine or enamine modified polyols, polyether polyols, polyester polyols, polyamines, such as alkanol amines, as well as diols and triols. The prepolymers of the present invention can be hard block prepolymer, soft block prepolymer or mixtures thereof.

Suitable isocyanate containing compounds for use in the preparation of the prepolymer may be aromatic, (cyclic) aliphatic, or araliphatic organic isocyanates. Suitable aromatic isocyanates include also polyisocyanates.

Preferably, isocyanate containing compounds for use in the preparation of the prepolymer may be aromatic, (cyclic) aliphatic, or araliphatic organic isocyanates having preferably x number of terminal groups, all being NCO-terminating groups.

Suitable polyisocyanates comprise polyisocyanates of the type Ra—(NCO)x, with x being at least 2 and Ra being an aromatic such as diphenylmethane, or toluene, or a similar polyisocyanate.

Non-limiting examples of suitable aromatic polyisocyanate monomers that can be used in the present invention can be any polyisocyanate compounds or mixture of polyisocyanate compounds, preferably wherein said compounds comprise preferably at least two isocyanate groups.

Non-limiting examples of suitable aromatic polyisocyanate monomers include diisocyanates, particularly aromatic diisocyanates, and isocyanates of higher functionality. Non-limiting examples of aromatic polyisocyanate monomers, which may be used in the present invention include aromatic isocyanate monomers such as diphenylmethane diisocyanate (MDI) in the form of its 2,4'-, 2,2'- and 4,4'-isomers and mixtures thereof (also referred to as pure MDI), the mixtures of diphenylmethane diisocyanates (MDI) and oligomers thereof (known in the art as "crude" or polymeric MDI), m- and p-phenylene diisocyanate, tolylene-2,4- and tolylene-2,6-diisocyanate (also known as toluene diisocyanate, and referred to as TDI, such as 2,4 TDI and 2,6 TDI) in any suitable isomer mixture, chlorophenylene-2,4-diisocyanate, naphthylene-1,5-diisocyanate, diphenylene-4,4'-diisocyanate, 4,4'-diisocyanate-3,3'-dimethyl-diphenyl, 3-methyl-diphenylmethane-4,4'-diisocyanate and diphenyl ether diisocyanate; tetramethylxylene diisocyanate (TMXDI), and tolidine diisocyanate (TODI); any suitable mixture of these polyisocyanates, and any suitable mixture of one or more of these polyisocyanates with MDI in the form of its 2,4'-, 2,2'- and 4,4'-isomers and mixtures thereof (also referred to as pure MDI), the mixtures of diphenylmethane diisocyanates (MDI) and oligomers thereof (known in the art as "crude" or polymeric MDI), and reaction products of polyisocyanates (e.g. polyisocyanates as set out above, and preferably MDI-based polyisocyanates). Preferably diphenylmethane diisocyanate (MDI) or toluene diisocyanates (TDI)-type isocyanates are used.

In some embodiments, said aromatic isocyanate monomer comprises a polymeric methylene diphenyl diisocyanate. The polymeric methylene diphenyl diisocyanate can comprise any mixture of pure MDI (2,4'-, 2,2'- and 4,4'-methylene diphenyl diisocyanate) and higher homologues of following formula:

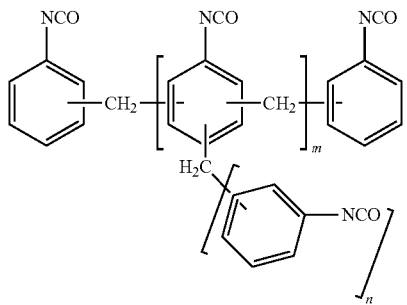

wherein n is an integer which can be equal to 0, 1 or 2, and wherein m is an integer which can range from 0 to 10, or equal to a higher value. Branched version can be preferred.

Preferably, the aromatic isocyanate monomer comprises diphenylmethane diisocyanate (MDI), polymeric forms thereof, and/or variants thereof (such as uretonimine-modified MDI).

The isocyanate-reactive compounds may be a component containing isocyanate-reactive groups. As used herein, the term "isocyanate-reactive groups" refers to chemical groups susceptible to electrophilic attack by an isocyanate group.

Non-limiting examples of said groups can be OH, SH, NH$_2$, NH, acids and other R—CH—R' groups. In some embodiments, said isocyanate-reactive compound comprises at least one OH group. Examples of suitable isocyanate-reactive compounds containing isocyanate-reactive OH atoms include polyols such as glycols or even relatively high molecular weight polyether polyols (e.g., above 1500, preferably above 3800) and polyester polyols, carboxylic acids such as polybasic acids.

In some preferred embodiments, the at least one isocyanate-reactive compound is selected from the group comprising hydroxyl terminated polyether (polyether polyols); polyols such as glycols; hydroxyl terminated polyester (polyester polyols); and mixtures thereof, all of which are well known to those skilled in the art.

Suitable hydroxyl terminated polyethers are preferably polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and are thus preferred. Useful commercial polyether polyols include poly(ethylene glycol) comprising ethylene oxide reacted with ethylene glycol, poly(propylene glycol) comprising propylene oxide reacted with propylene glycol, poly(tetramethylglycol) (PTMG) comprising water reacted with tetrahydrofuran (THF). Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilised in the current invention. Typical copolyethers include the reaction product of glycerol and ethylene oxide or glycerol and propylene oxide.

The isocyanate-reactive compound of the present invention has a number average molecular weight (MW) equal to or higher than 62, preferably higher than 400 g/mol, more preferably equal to or higher than 500 g/mol. Preferably, polyols have a number average molecular weight equal to or higher than 62, preferably equal to or higher than 400 g/mol, preferably equal to or higher than 500 g/mol.

For isocyanate-reactive compound having a number average molecular weight equal to or higher than 400 g/mol, more preferably equal to or higher than 500, the various polyethers can have a molecular weight (MW), of at least 500 to at most 20000 g/mol, desirably from at least 600 to at most 10000 g/mol, more preferably of at least 1000 to at most 12000 g/mol.

The molecular weight is determined by assay of terminal functional groups and is related to the number average molecular weight.

The hydroxyl terminated polyester can be produced by (1) an esterification reaction of one or more glycols with one or more dicarboxylic acids or anhydrides, or (2) by transesterification reaction, i.e. the reaction of one or more glycols with esters of dicarboxylic acids. Mole ratios generally in excess of more than one mole of glycol to acid are preferred so as to obtain linear chains having a preponderance of terminal hydroxyl groups. Suitable polyesters also include various lactones such as polycaprolactone typically made from caprolactone and a bifunctional initiator such as diethylene glycol. The dicarboxylic acids of the desired polyester can be aliphatic, cycloaliphatic, aromatic, or combinations thereof. Suitable dicarboxylic acids which can be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, the like, and mixtures thereof 1,4-butanediol is the preferred glycol.

In some embodiments, the isocyanate-reactive compound can be reacted with at least one isocyanate, along with extender glycol. Non-limiting examples of suitable extender glycols (i.e., chain extenders) include lower aliphatic or short chain glycols having from about 2 to about 10 carbon atoms and include, for instance, ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol, hydroquinone di(hydroxyethyl)ether, neopentylglycol, and the like.

Suitable amine compounds that may be used in the present invention include, without limitation, di-functional amines, polyfunctional amines, mixtures of amines, in particular amines comprising di-functional amines or combinations thereof. For example, primary amines, secondary amines, or combinations thereof may be used as the amine compound in the present invention. Preferably primary amines are used. Most preferably primary amine unhindered on the carbon in alpha of the amine. Examples of such amines include, without limitation, those selected from the group consisting of 1,2-ethanediamine, N,N'-bis(3-aminopropyl)methylamine, N,N'-dimethyl ethylene diamine, neopentanediamine, 4,4'-diaminodiphenyl methane and 2-methylpentamethylenediamine (such as DYTEK A available from Invista, Wilmington, Del., U.S.A.). Additionally, polyetheramines (such as JEFFAMINE polyetheramines available from the Huntsman Corporation, The Woodlands, Tex., U.S.A.), (such as ELASTAMINE HT1100, ECA-29, EDR 148) may be used in the invention, and combination thereof.

Preferably, the at least one amine functional group containing compound involved in step (iii) of the present invention has a functionality of at least 2. This functionality is defined according to the amine functional groups, which consist of primary amines. The at least one amine functional group containing compound has preferably at least 2 amine based functional groups consisting of primary amine.

According to a preferred embodiment the molar ratio carbonate ring/—NH$_2$ is 1:1.

Non-limiting examples of suitable catalysts for the ring-closure reaction include 1,4-Diazabicyclo[2.2.2]octane (DABCO), 1,8-Diazabicyclo(5.4.0)undec-7-ene (DBU), Triazabicyclodecene (TBD), triethylamine, and potassium t-butanoate.

Suitable catalysts that may be used in the present invention, include without limitation, tertiary amines, tin-containing compounds, any standard urethane catalyst known in the polyurethane formation art such as triethylene diamine (TEDA), dibutyl tin dilaurate (DBTDL), titanium or zirconium containing compounds (e.g., TYZOR available from DuPont), or combinations thereof. Preferably, the catalyst is present in an amount of at least 10 ppm, preferably at least 0.01% by weight, preferably at least 0.05% by weight, with % by weight based on the total weight of the prepolymer.

In a preferred embodiment, steps (ii) and (iii) are performed in a solvent free condition.

Non-limiting examples of (isocyanate reactive) cyclic carbonate functional group containing compounds are listed below:

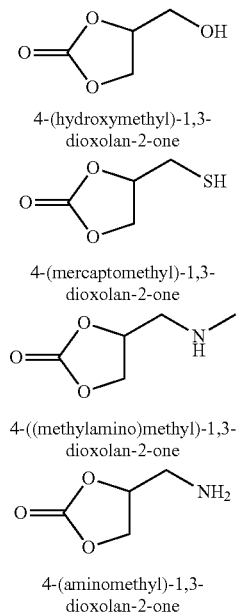

4-(hydroxymethyl)-1,3-dioxolan-2-one 4-(mercaptomethyl)-1,3-dioxolan-2-one 4-((methylamino)methyl)-1,3-dioxolan-2-one 4-(aminomethyl)-1,3-dioxolan-2-one

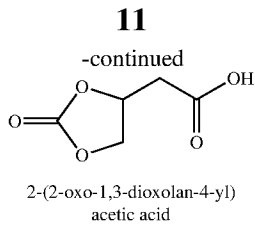

2-(2-oxo-1,3-dioxolan-4-yl)
acetic acid

Glycerol carbonate is preferred.

As used herein, the term "isocyanate-containing compound" refers to a compound, which comprises at least one isocyanate group (—N═C═O), whereby the isocyanate group may be a terminating group. Preferably, the isocyanate group is a terminating group.

The isocyanate content (NCOv) (also referred to as percent NCO or NCO content) of prepolymers, given in weight %, was measured by conventional NCO titration following the standard ASTM D5155 method, preferably with Metrohm Titrino Plus. In brief, isocyanate is reacted with an excess of di-n-butylamine to form ureas. The unreacted amine is then titrated with standard nitric acid to the color change of bromocresol green indicator or to a potentiometric endpoint. The percent NCO or NCO-value is defined as the percent by weight of NCO-groups present in the product.

In the context of the present invention, the expression "NCO value" corresponds to an isocyanate value, which is the weight percentage of reactive isocyanate (NCO) groups in an isocyanate containing compound or prepolymer and is determined using the following equation, where the molecular weight of the NCO group is 42:

$$\text{Isocyanate value} = \text{weight \% } NCO \text{ groups} = \frac{42 \times \text{Number average functionality}}{\text{Number average molecular weight}} \times 100$$

Infrared spectroscopy (IR) was performed on a Perkin Elmer Spectrum 100 FT-IR spectrometer. ATR-IR was performed by placing a drop of the reaction solution directly onto the ATR crystal and recording the spectra with a resolution of 4 cm$^{-1}$ and 16 scans. The recorded spectra were normalised at the peak at 1090 cm$^{-1}$, corresponding to the bending of the C—O bonds present in the isocyanate-reactive compound (e.g., polyol).

The number average molecular weight, in particular of the polyol and its distribution were analysed via gel permeation chromatography (GPC) performed by dissolving the sample in THF (at 5 wt % concentration) and analysed using a refractive index detector. Detection is based on retention time and is done by use of an UV detector. The Agilent G1310B instrument was equipped with 2×PLgel 5 μm columns (flow rate of 30 ml/min). Area % distribution of prepolymer peaks was given as a result. The obtained chromatogram was contrasted with a polystyrene standard calibration curve.

Young's modulus (kPa), Elongation at break (%), Stress at break (kPa) were measured according to ISO DIN53504. "Dog bone" specimen of the PU-PHU hybrid compound having a cross section of 4×2 mm were strained at 100 mm/min with an Instron device.

In the context of the present invention, viscosity can be measured via Rheometrics (a Brookfield R/S-CPS-P2 Rheometer fitted with C25-2 cone spindle at 350 Pa with a cone and plate geometry (CONE SST 20 mm×0.5), using a shear rate of 100-300 rotation per minute, and a 250-450 micron truncation gap. The viscosity can be measured at ambient temperature (i.e., 25° C.), 50° C., or 75° C.

The viscosity of the at least one prepolymer, said cyclic carbonate-terminated prepolymer, and/or said hybrid PU-PHU composition is preferably non-Newtonian.

The wording "conversion of the cyclic carbonate-terminated prepolymer" should be understood as corresponding to step (iii) of the present invention, during which the addition of said amine functional group containing compound leads to the ring-opening of said cyclic carbonate-terminated prepolymer. Practically, the conversion can be defined as hundred times the ratio between the area of the carbonate carbonyl peak in the FT-IR spectrum of the cured PU-PHU and the area of the same peak in the in the FT-IR spectrum of the GC-prepolymer before curing it with amines.

Tg can be measured by Differential Scanning calorimeters (DSC) analysis, which were performed with TAQ2000 DSC device. The thermal protocol can consist of a heating ramp from −90° C. to +200° C., followed by a cooling ramp to −90° C., with heating rate of 10° C./minute.

The terms "(re)processable/(re)processed/(re)processability/(re)processable" used in the present invention refer to reprocessability under a certain pressure at a predetermined temperature, when thermoset polymers, are obtained by the process of the present invention, or refer to intrinsic reprocessability, when thermoplastic polymers, are obtained in the context of the present invention, without the need to apply any external stimulus to enable reprocessing of the given polymer.

According to a preferred embodiment of the present invention, a glycerol carbonate-terminated prepolymer (GC-terminated prepolymer) can be reacted with a primary amine in a molar ratio carbonate ring/—NH$_2$ 1:1, preferably in presence of 0.5 wt. % of a selected catalyst. The reaction is flushed with dry nitrogen, mixed with a mechanical stirrer and the internal temperature of the reaction is monitored with a digital thermocouple. The chosen GC terminated-prepolymer is weighed out in a disposable glass bottle, the catalyst is added, and the mixture is heated with an oil bath at 100° C. (unless differently specified) under vigorous mechanical stirring. When the reaction temperature is reached, the amine is added with an addition funnel. When two different amines are used, the less reactive is preferably added first, in order to react it for 15 minutes, and eventually the second amine can be added. The stirring time is adapted depending on the reactivity of the amine(s) employed and, consequently, on the resulting viscosity build-up. The reaction is followed via ATR FT-IR looking at the disappearance of the carbonate carbonyl peak at 1810 cm$^{-1}$ and at the simultaneous rise of the urethane peaks at about 1704 cm$^{-1}$. In order to obtain thin films, the mixture can be homogenised by mixing at high speed and immediately transferred into a closed mould, heated at 100° C. in order to complete the curing.

The following examples illustrate some embodiments of the present invention.

Examples of Chemicals

| Products | Trade name | Description | Supplier |
|---|---|---|---|
| Isocyanates | SUPRASEC ® 1306 | 4,4'-MDI | Huntsman |
| Polyols | Acclaim 4200 | PPG, Mw 2000 g/mol, f = 1.98 | Covestro |
| | Acclaim 2200 | PPG, Mw 4000 g/mol, f = 1.98 | |

-continued

| Products | Trade name | Description | Supplier |
|---|---|---|---|
| Carbonates | JEFFSOL ® GC | Glycerol Carbonate | Huntsman |
| Amines | JEFFAMINE ® EDR 148 | 3,6-dioxaoctamethylenediamine | Huntsman |
|  | ECA 29 | Epoxy Curing Agent, polyamine mix | Huntsman |
|  | Tris(2-aminoethyl)amine | Trifunctional amine | Sigma Aldrich |
| Catalysts | DABCO | Triethylenediamine | Sigma Aldrich |
|  | TBD | 1,5,7-Triazabicyclo[4,4,0]dec-5-ene |  |
|  | DBU | 1,8-Diazabicyclo[5.4.0]undec-7-ene Sigma Aldrich |  |

EXAMPLES

Example 1—Synthesis of NCO Terminated Prepolymers

The NCO terminated prepolymers were prepared by reacting an isocyanate and a polyol in a molar ratio NCO/OH 2:1 (or higher).

400.24 g of 4,4'-MDI (SUPRASEC®1306; 3.19 mol —NCO, NCOv=33.52%) are weighed out in a reactor with 4-neck lid equipped with mechanical stirrer, addition funnel, digital thermocouple and nitrogen flow. The 4,4'-MDI is heated to 80° C., under nitrogen flux. When the reaction temperature is reached, 1593.72 g of PPG (functionality=1.98, OHv=56.2 mg KOH) (1.60 moles —OH) are added drop wise, while the mixture is mechanically stirred under nitrogen blanket. The conversion of isocyanates is monitored via potentiometric NCO titrations, until the targeted NCOv (3.37±0.05%) is reached and maintained a constant value over time. The obtained NCO terminated prepolymers having a non-Newtonian viscosity of 30 Pa·s at ambient temperature (25° C.) can be stored in a sealed metal bottle under nitrogen atmosphere.

Example 2—Functionalisation of Prepolymers with Glycerol Carbonate (GC)

In this example, the functionalisation is performed with the same setup used for the synthesis of the prepolymer obtained in example 1. GC (JEFFSOL®) and isocyanates are reacted in an equimolar ratio. The reaction is performed in a catalyst free condition. 250.11 g of the prepolymer (0.2 mol —NCO) of example 1 is heated at 70° C., under nitrogen blanket. When the prepolymer reaches the reaction temperature, 23.67 g of GC (0.2 mol —OH) is added drop wise with an addition funnel. The reaction is highly exothermic, and the mixture turns from transparent to opaque white. The reaction was followed by ATR FT-IR, and monitored by observing the disappearance of the peak at 2270 $cm^{-1}$, corresponding to unreacted isocyanates, and, at the same time, observing the rise of the urethane peak at 1726 $cm^{-1}$. When the reaction is completed, the product was stored at room temperature, under nitrogen atmosphere.

GC terminated prepolymer has a non-Newtonian viscosity of 1333 Pa·s at ambient temperature (25° C.).

Preferably, the DABCO catalyst could be occasionally used up to 0.05 wt. %, in order to reduce the reaction time.

Example 3—Synthesis of NCO Terminated Prepolymers

The NCO terminated prepolymers were prepared by reacting an isocyanate and a polyol with a MW of 4000 in a molar ratio NCO/OH 2:1 (or higher).

200.09 g of 4,4'-MDI (SUPRASEC®1306; 1.6 mol —NCO, NCOv=33.48%) are weighed out in a reactor with 4-neck lid equipped with mechanical stirrer, addition funnel, digital thermocouple and nitrogen flow. The 4,4'-MDI is heated to 80° C., under nitrogen flux. When the reaction temperature is reached, 1597.94 g of PPG (functionality=1.98, OHv=28.2 mg KOH) (0.8 mol —OH) are added drop wise, while the mixture is mechanically stirred under nitrogen blanket. The conversion of isocyanates is monitored via potentiometric NCO titrations, until the targeted NCOv (1.85±0.05%) is reached and maintained a constant value over time. The obtained NCO terminated prepolymers having a non-Newtonian viscosity of 25 Pa·s at ambient temperature (25° C.) can be stored in a sealed metal bottle under nitrogen atmosphere.

Example 4—Functionalisation of Prepolymers with Glycerol Carbonate (GC)

In this example, the functionalisation is performed with the same setup used for the synthesis of the prepolymer obtained in example 3. GC and isocyanates are reacted in an equimolar ratio. The reaction is performed in a catalyst free condition. 750 g of the prepolymer (0.33 mol —NCO) of example 3 is heated at 70° C., under nitrogen blanket. When the prepolymer reaches the reaction temperature, 40.93 g of GC (0.35 mol —OH) is added drop wise with an addition funnel. The reaction is highly exothermic and the mixture turns from transparent to opaque white. The reaction was followed by ATR FT-IR, and monitored by observing the disappearance of the peak at 2270 $cm^{-1}$, corresponding to unreacted isocyanates, and, at the same time, observing the rise of the urethane peak at 1726 $cm^{-1}$. When the reaction is completed, the product was stored at room temperature, under nitrogen atmosphere.

GC terminated prepolymer has a non-Newtonian viscosity of 852 Pa·s at ambient temperature (25° C.).

Preferably, the DABCO catalyst could be occasionally used up to 0.05 wt. %, in order to reduce the reaction time.

Example 5—Viscosity Measures

TABLE 1

| Prepolymers | Viscosity at 25° C. (Pa · s) | Viscosity at 50° C. (Pa · s) | Viscosity at 75° C. (Pa · s) |
|---|---|---|---|
| SUPRASEC ® 1306/PPG2000 (NCOv = 3.36%) - example 1 | 30 | 4.9 | 1.3 |

TABLE 1-continued

|  | Viscosity at 25° C. (Pa · s) | Viscosity at 50° C. (Pa · s) | Viscosity at 75° C. (Pa · s) |
|---|---|---|---|
| SUPRASEC ® 1306/PPG4000 (NCOv = 1.86%) - example 3 GC terminated prepolymers | 25 | 3.8 | 1.1 |
| GC-SUPRASEC ®1306/PPG2000 - example 2 | 1333 | 100 | 15 |
| GC-SUPRASEC ®1306/PPG4000 - example 4 | 852 | 71 | 9 |

Example 6—Polymerisation of GC Terminated Prepolymer of Example 2

The synthesised GC-functionalised prepolymer of example 2 is reacted with JEFFAMINE® EDR 148, bifunctional primary amine, in a stoichiometric ratio carbonate ring/—$NH_2$ 1:1, in presence of 0.5 wt. % of DABCO. The reaction is performed with dry nitrogen and a mechanical stirrer, and the internal temperature of the reaction is monitored with a digital thermocouple.

74.81 g of the GC-terminated prepolymer (0.027 mol) is weighed out in a disposable glass bottle, DABCO is added (0.5 wt. %) and the mixture is heated with an oil bath at 100° C., under vigorous mechanical stirring. When the reaction temperature is reached, 4.053 g of JEFFAMINE® EDR 148 (0.0274 mol) is added with an addition funnel.

The reaction is monitored with ATR FT-IR by observing the disappearance of the carbonyl peak at 1810 $cm^{-1}$, and the simultaneous appearance of the urethane carbonyl peaks at 1704 $cm^{-1}$. The reaction is then stopped after 2 hours, when no further changes were observed in the infrared spectra. The final product is opaque and white.

Preferably, when two different amines are used, the less reactive is added first, and reacts for 15 minutes, and eventually, the second amine is added. The stirring time is thereby adapted depending on the reactivity of the amine(s) employed and, consequently, on the resulting viscosity build-up.

The carbonate ring-opening conversion is 91%, measured with FT-IR.

Example 7—Polymerisation of GC Terminated Prepolymer of Example 4

The same procedure as detailed for example 6 is applied, except that the GC terminated prepolymer of example 4 was used.

In this example, the carbonate ring-opening conversion is 94%, measured with FT-IR.

Example 8—Combination of Amines

Table 2 illustrates two embodiments of example 8. PU-PHU products are prepared by reacting GC terminated prepolymer of example 2 (NCOv of 3.37 wt %-S1306/PPG2000) with a mixture of ECA-29 and JEFFAMINE® EDR 148 in different proportions of amines (i.e., 50 wt. % and 100 wt. %, respectively samples 1 and 2). In the present example, the cures are performed by reacting 69.55 g of GC terminated prepolymer (0.0254 mol) with 1.88 g of difunctional JEFFAMNE® EDR 148 (0.0127 mol) first, and after 15 minutes 3.46 g of ECA-29 (0.0128 mol) is added to complete the curing.

It was found that when only 25 wt. % of ECA-29 was used, the material becomes soluble in warm DMSO and thermo-processable. When using at least 50 wt. % of ECA 29, the resulting polymers were thermoset, indicating a significant degree of crosslinking.

Mechanical properties are also illustrated in table 2

TABLE 2

| PU-PHU | JEFFAMINE ® EDR 148 (mol %) | ECA-29 (mol %) | Elongation at break (%) | Stress at break (kPa) | Young's Modulus (kPa) |
|---|---|---|---|---|---|
| 1 | 50 | 50 | 2214 | 4104 | 1322 |
| 2 | 0 | 100 | 893 | 3261 | 1757 |

Mol % referred in the aforementioned table is expressed relative to the total moles of GC-prepolymer.

Example 9—Trifunctional Amine

Table 3 illustrates two embodiments of example 9. PU-PHU products are prepared by reacting GC terminated prepolymer of example 2 (NCOv of 3.37 wt %-S1306/PPG2000) and example 4 (NCOv of 1.85 wt %-S1306/PPG4000) with tris(2-aminoethyl)amine (trifunctional amine).

The same protocol as described above is applied, resulting in the conversion of GC-terminated prepolymer of 93%, after one hour.

The mechanical properties of the polyhydroxyurethanes prepared with tris(2-aminoethyl)amine are illustrated in table 3 below.

TABLE 3

| PU-PHU | Amine | Elongation at break (%) | Stress at break (kPa) | Young's Modulus (kPa) |
|---|---|---|---|---|
| NCOv of 3.37 wt %-S1306/PPG2000 | tris(2-aminoethyl)amine | 555 | 2895 | 1919 |
| NCOv of 1.85 wt %-S1306/PPG4000 | tris(2-aminoethyl)amine | 1056 | 1384 | 763 |

Example 10

A dry hybrid PU/PHU thermoset polymer, prepared from a GC-prepolymer, as illustrated in example 2 (Suprasec 1306+PPG 2000 NCOv=3.37%) and tris(2-aminoethyl) amine, was cut into small pieces having approximately dimensions (l, w, t) 3×4×2 mm.

The beads were placed on a sheet of non-sticking paper forming a circle having a diameter of 6 cm. The sample was then placed on the bottom plate of an hydraulic press Servitec Polystat 200T, previously pre-heated at 140° C., and a mechanical pressure of 11 MPa was applied in order to obtain a thickness of 1 mm. After 30 minutes the sample was removed from the press and allowed to cool down at room temperature. As a result of the reprocessing procedure, the small pieces merged into a single film. At least one "dogbone" specimen for tensile test was cut out of the reprocessed film. The remaining part was cut again into small pieces and reprocessed following the same procedure up to three times in total.

| Specimen | Young Modulus (MPa) | Strain at break (%) | Stress at break (MPa) |
|---|---|---|---|
| PU-PHU polymer | 1.73 | 358 | 2.57 |
| Reprocessed PU-PHU 1st cycle | 1.81 | 345 | 4.37 |
| Reprocessed PU-PHU 2nd cycle | 1.63 | 249 | 2.85 |
| Reprocessed PU-PHU 3rd cycle | 1.64 | 295 | 3.61 |

The tensile mechanical properties were determined with a Zwick ProLine Z020 testing machine. The following parameter have been employed: strain speed 200 mm/min, preload 0.5 N, modulus was calculated between 5% and 10% strain.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

As used herein, the singular forms "a", "an", and "the" include both singular and plural referents unless the context clearly dictates otherwise. By way of example, "an isocyanate group" means one isocyanate group or more than one isocyanate group.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of". This means that, preferably, the aforementioned terms, such as "comprising", "comprises", "comprised of", "containing", "contains", "contained of", can be replaced by "consisting", "consisting of", "consists".

Throughout this application, the term "about" is used to indicate that a value includes the standard deviation of error for the device or method being employed to determine the value.

As used herein, the terms "% by weight", "%", "weight percentage", or "percentage by weight" are used interchangeably.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 30 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

Throughout this application, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. Although the preferred embodiments of the invention have been disclosed for illustrative purpose, those skilled in the art will appreciate that various modifications, additions or substitutions are possible, without departing from the scope and spirit of the invention as disclosed in the accompanying claims.

The invention claimed is:

1. A method of making a hybrid polyurethane-polyhydroxyurethane (PU-PHU) composition obtained by a process comprising the following steps:
   (i) reacting at least one isocyanate containing compound, in stoichiometric excess, with at least one isocyanate-reactive compound, resulting in the formation of at least one prepolymer,
   (ii) reacting said at least one prepolymer with at least one cyclic carbonate functional group containing compound, leading to the formation of a cyclic carbonate-terminated prepolymer, wherein the at least one cyclic carbonate functional group containing compound comprises one or more of: 4-(mercaptomethyl)-1,3-dioxolan-2-one, 4-((methylamino)methyl)-1,3-dioxolan-2-one, 4-(aminomethyl)-1,3-dioxolan-2-one, and 2-(2-oxo-1,3-dioxolan-4-yl)acetic acid, and
   (iii) performing a ring-opening reaction of said cyclic carbonate-terminated prepolymer with at least one amine functional group containing compound above room temperature resulting in said hybrid PU-PHU composition.

2. The method according to claim 1, wherein the amine of said at least one amine functional group containing compound has a functionality of at least 1.8.

3. The method according to claim 1, wherein the temperature at which said ring-opening reaction step is carried out ranges from 25° C. to 160° C.

4. The method according to claim 1, wherein said at least one isocyanate-reactive compound has a number average molecular weight equal to or higher than 62.

5. The method according to claim 1, wherein step (ii) is carried out at a molar ratio of said at least one prepolymer to said at least one cyclic carbonate functional group containing compound (NCO:OH) ranging from 0.5 to 1.05.

6. The method according to claim 1, wherein said at least one prepolymer has an NCO value ranging from 0.8 to 25%.

7. The method according to claim 1, wherein step (ii) is performed at a temperature ranging from 50° C. to 150° C.

8. The method according to claim 1, wherein step (ii) is carried out in a solvent free condition.

9. The method according to claim 1, wherein step (ii) and/or step (iii) is carried out in presence of a catalyst selected from the group consisting of 1,4-diazabicyclo [2.2.2]octane (DABCO), 1,8-diazabicyclo(5.4.0)undec-7-ene (DBU), triazabicyclodecene (TBD), triethylamine, and potassium t-butanoate, and mixtures thereof.

10. The method according to claim 1, wherein said at least one cyclic carbonate functional group containing compound further comprises glycerol carbonate.

11. The method according to claim 1, wherein step (iii) is achieved in a period of time of up to 3 hours.

12. The method according to claim 1, wherein the conversion of the cyclic carbonate-terminated prepolymer of step (iii) is of at least 90.

13. A product comprising a PU-PHU composition made according to claim 1.

14. A method for processing a thermoset hybrid PU-PHU product, wherein the method comprises the following steps:
    providing a cured thermoset hybrid PU-PHU product made by the process according to claim 1, which product has an outer surface;
    processing said cured thermoset hybrid PU-PHU product by applying at least one stimulus, onto said outer surface, at a predetermined temperature and/or for a predetermined period of time; and
    obtaining a processed hybrid PU-PHU product.

15. A method of making a hybrid polyurethane-polyhydroxyurethane (PU-PHU) composition obtained by a process comprising the following steps:
    (i) reacting at least one isocyanate containing compound, in stoichiometric excess, with at least one isocyanate-reactive compound, resulting in the formation of at least one prepolymer, the
    (ii) reacting said at least one prepolymer with at least one cyclic carbonate functional group containing compound, leading to the formation of a cyclic carbonate-terminated prepolymer, wherein the at least one cyclic carbonate functional group containing compound comprises a 4-membered cyclic carbonate and/or a 6-membered cyclic carbonate, and
    (iii) performing a ring-opening reaction of said cyclic carbonate-terminated prepolymer with at least one amine functional group containing compound above room temperature resulting in said hybrid PU-PHU composition.

16. The method according to claim 15, wherein said at least one cyclic carbonate functional group containing compound further comprises glycerol carbonate.

17. The method according to claim 1, wherein the temperature at which said ring-opening reaction step is carried out ranges from 100° C. to 160° C.

* * * * *